United States Patent [19]

Häfner et al.

[11] Patent Number: 4,754,653

[45] Date of Patent: Jul. 5, 1988

[54] FORCE MEASURING DEVICE

[75] Inventors: Hans W. Häfner, Aichach-Walchshofen; Günter Bock, Friedberg, both of Fed. Rep. of Germany

[73] Assignee: Pfister GmbH, Augsburg, Fed. Rep. of Germany

[21] Appl. No.: 907,771

[22] PCT Filed: Dec. 10, 1985

[86] PCT No.: PCT/EP85/00691

§ 371 Date: Aug. 7, 1986

§ 102(e) Date: Aug. 7, 1986

[87] PCT Pub. No.: WO86/03584

PCT Pub. Date: Jun. 19, 1986

Related U.S. Application Data

[63] Continuation-in-part of Ser. No. 680,126, Dec. 10, 1984, Pat. No. 4,644,805.

[30] Foreign Application Priority Data

Dec. 10, 1984 [DE] Fed. Rep. of Germany ....... 3444996
Dec. 10, 1984 [GB] United Kingdom ............... 84115029

[51] Int. Cl.$^4$ ................................................ G01L 5/00
[52] U.S. Cl. ............................... 73/862.68; 73/862.58; 73/862.64; 338/2

[58] Field of Search .......... 73/862.68, 862.65, 862.64, 73/862.38, DIG. 4, 768, 862.58, 777; 177/211, 210 R; 338/5, 2; 310/345; 29/454

[56] References Cited

U.S. PATENT DOCUMENTS

| 1,994,388 | 3/1935 | Erichsen | 73/862.62 |
| 2,847,707 | 8/1958 | Sullivan | 18/26 |
| 3,410,135 | 11/1968 | Reynand | 73/862.38 |
| 3,582,691 | 6/1971 | Sonderegger et al. | 310/8.7 |
| 4,127,788 | 11/1978 | Daugherty | 310/328 |
| 4,167,381 | 9/1979 | Hilmoe | 425/182 |
| 4,175,429 | 11/1979 | Keck | 73/862.68 |
| 4,383,584 | 5/1983 | Dyck | 177/208 |
| 4,644,805 | 2/1987 | Hafner | 73/862.68 |

FOREIGN PATENT DOCUMENTS

| 0516321 | 12/1920 | France . |
| 2093260 | 1/1972 | France . |
| 2126695 | 10/1972 | France . |
| 1347586 | 2/1974 | United Kingdom . |
| 2001766 | 2/1979 | United Kingdom . |
| 2024697 | 1/1980 | United Kingdom . |

Primary Examiner—Donald O. Woodiel
Attorney, Agent, or Firm—Armstrong, Nikaido, Marmelstein & Kubovcik

[57] ABSTRACT

The force measuring device comprises two plates arranged essentially parallel to each other and having therein between an elastomeric material into which a pressure sensor is embedded.

14 Claims, 4 Drawing Sheets

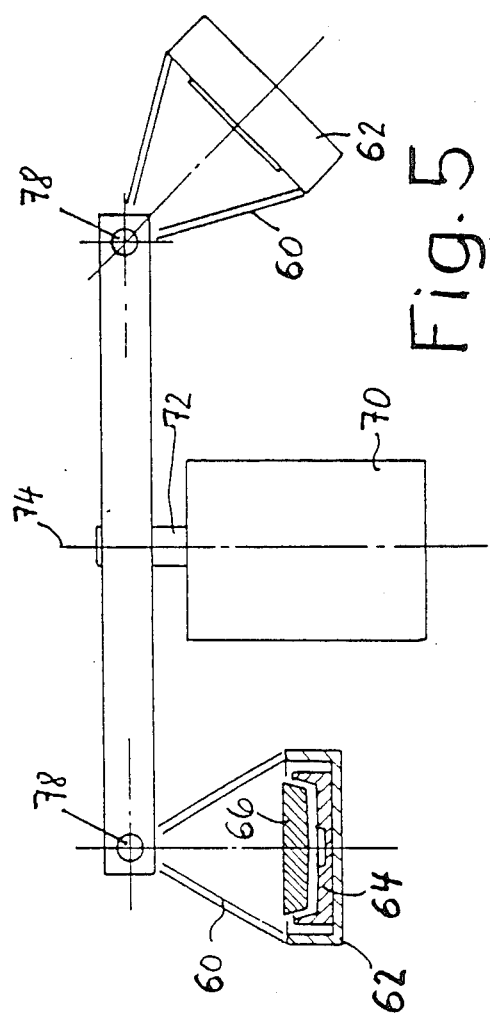

FORCE MEASURING DEVICE

This application is a continuation-in-part of application Ser. No. 680,126 filed Dec. 10, 1984, now U.S. Pat. No. 4,644,805.

TECHNICAL FIELD

The present invention relates to a force measuring device for measuring a force exerted onto a force introduction member inserted into a potlike base member. In the bottom region of the interior of the base member elastomeric material is provided having embedded a pressure transducer or sensor.

BACKGROUND ART

The U.S. Pat. No. 3,410,135 discloses a force measuring device where at the bottom of a potlike base member an elastomeric block is arranged having a slightly raised peripheral lip. Patent force introduction piston having a substantially smaller diameter than the cylindrical interior of the base member fits with its lower face edge into the recess formed by the raised lip. The gap between the peripheral surface of the piston and the cylindrical inner surface of the base member is relatively large and of such a width that upon application of a force no elastomeric material is squeezed out of the base member by the piston. In view of the relatively large gap the piston may assume a certain oblique position with respect to the cylindrical interior on the base member without engaging the surface of the latter. In order to limit such an oblique position of the piston a resilient washer may be provided in the upper region of the annular gap between the piston and the interior surface of the base member. There is no connection between the elastomeric material and the metallic surfaces of the base member and the piston in contact with the elastic material. Without the washer considerable lateral forces will be transmitted to the elastomeric material and cause misreadings of the force measured. With the washer provided a new element of friction is introduced which in turn deteriorates the measuring results. Since the annular gap is relatively wide elastomeric material will be pressed into it at least upon application of large forces which gives rise to further inaccuracies of the measurement.

The U.S. Pat. No. 4,175,429 discloses a force measuring device comprising a pressure sensitive metal wire embedded in a block of vulcanized silicon rubber provided at the bottom of a cylindrical recess in a base member and compressible by means of a movable piston acting as a force introduction member onto the silicon rubber. A considerable space is allowed between the interior cylindrical wall of the base member and the peripheral surface of the piston. In order that a clearance may be maintained as large as possible a sealing ring is provided at the edge of the lower face surface of the piston in contact with the silicon rubber. The sealing ring is in contact with the cylindrical surface of the interior of the base member which results in a considerable friction affecting the accuracy of the force measuring device. Furthermore, any lateral force component of a force applied at an oblique angle onto the force introduction member acts at least partially onto the elastomeric material which again deteriorates the accuracy of measurement.

DISCLOSURE OF THE INVENTION

It is an object of the invention to provide a force measuring device having a simple design and excellent operating parameters.

Another object of the present invention is to provide a force measuring device which is insensitive to lateral force components whilst exactly measuring the vertical force component of a force applied to the force introduction member at an oblique angle.

Still another object of the present invention is a method for producing force measuring devices with increased accuracy.

These and other objects of the invention are achieved by the device and the method as defined in the appended claims.

MODES FOR CARRYING OUT THE INVENTION

Figure 1:
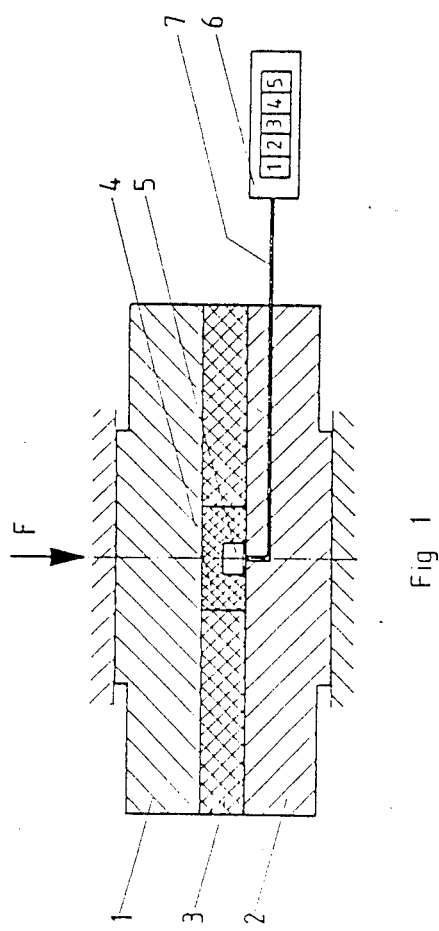
FIG. 1 shows the principle design of a force measuring device according to the invention in a vertical sectional view.
Figure 2:
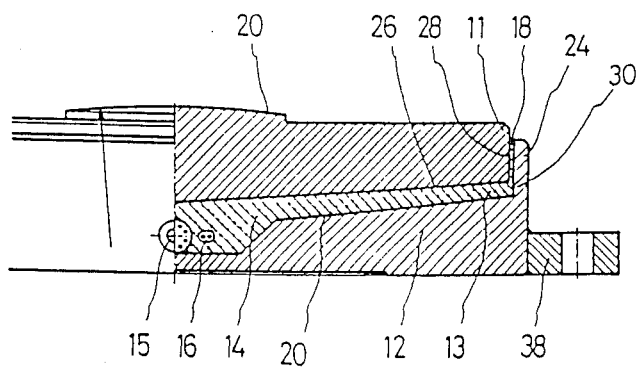
FIG. 2 is a side view partially in section illustrating a force measuring device produced with an apparatus according to FIG. 5.
Figure 3:
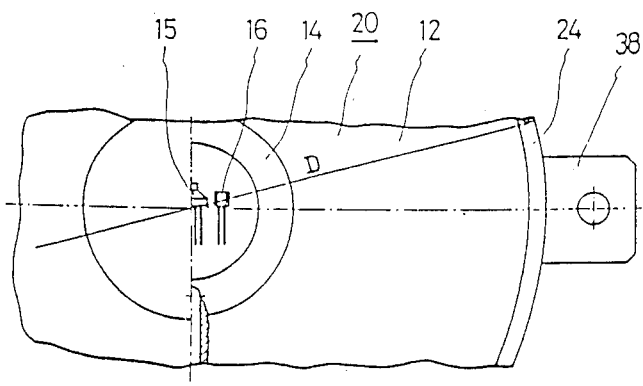
FIG. 3 is a top view of the force measuring device of FIG. 2.

FIG. 1 shows the principle design of a force measuring device according to the invention in a vertical sectional view and FIGS. 2 and 3 shows a vertical sectional view and a plan view, respectively, of a force measuring device as designed for practical use.

According to FIG. 1 an elastomeric material 3 is arranged between two members 1, 2, opposite face surfaces of which are in a parallel arrangement to each other. Basically no connection between the members 1, 2 and the elastomeric material 3 would be necessary since there is no sealing necessary. However, according to the invention the elastomeric material 3 is secured at the opposing face surfaces of the members 1, 2 either by an adhesive or by vulcanization.

Within the elastomeric material there is provided a pressure sensor which, as an example, may be a piezoelectric or piezoresistive pressure transducer 5 which converts pressure into an electrical signal. The pressure transducer 5 is connected via an electrical conductor 7 to a pressure measuring and indicating apparatus 6. This apparatus may comprise a digital voltmeter which receives the force-proportional signal from the pressure transducer 5.

In one embodiment of the force measuring device according to the invention the piezoelectric pressure transducer 5 is embedded in a material 4 contained in a recess in the elastomeric material 3 and which has a higher viscosity than the latter material.

The material 4 may be a gel like silicone. If a force F is exerted normal onto force introduction member 1 preferably consisting of metal, such a force is transferred to the elastomeric material 3 which transmits this force to the piezoelectric pressure transducer 5 in a pressure proportional manner.

The piezoelectric pressure transducer may be replaced by a strain measuring gauge connected in a Wheatstone bridge or any other appropriate pressure sensor.

Alternatively, the pressure exerted to the elastomeric material 3 may be transferred to a corresponding measuring and indicating apparatus by filling the recess in the elastomeric material 3 with a liquid and having this liquid exerting the pressure via a liquid lead 7 directly to the measuring and indicating apparatus which then provides a direct hydraulic indication.

In situations where forces are exerted non-uniformly onto the upper surface member 1, several pressure transducers may be distributed in the elastomeric material 3. The members 1 and 2 or at least member 1 may have then a considerable surface, for instance in accordance with the dimensions of a truck. The pressure transducers would then be distributed in a matrix array over such a force measuring carpet. The signals derived from the pressure transducers will then be supplied to an evaluation apparatus which calculates the exerted total force and indicates the latter.

Particular fields of application of the force measuring device according to the invention are measuring the weight of very large containers or the load exerted onto the wheel or axle of a truck or other vehicle.

A practical embodiment of a force measuring device manufactured according to the method of the invention is shown in FIGS. 2 and 3. Between an upper member 11 and a base member 12 there is provided elastomeric material 13 into which a pressure transducer or sensor 15 and associated resistors 16 for temperature compensation are embedded. By means of a flange 38 the base member 12 may be secured to a base or support (not shown) whilst the force is exerted to the upper surface of the upper member 11 which may be provided with a spherical region 21.

According to this embodiment the region formed between the two opposing inner sufaces of the members 11 and 12 has a more specific form. In particular, the lower surface 26 of the upper member 11 has a slightly convex or conical shape. The upper surface 20 of the base member 12 may be formed concave resulting in a flat cup-like form. A broadened recessed central region 14 serves for the arrangement of the pressure sensor 15 and the compensation resistors 16. Furthermore, the base member 12 is provided with an upwardly extending peripheral rim 24 for insertion of the upper plate 11. The dimensions are such that between the outer peripheral surface 28 of the upper member 11 and the cylindrical inner surface 30 of the rim 24, there is only a very narrow circular gap 18 which in accordance with the dimensions of the embodiment shown in FIGS. 2 and 3 is in the order of 0.1 to 2 mm preferable in the region between 0.2 and 1 mm. The narrow gap width has the advantage that the force measuring device has a high rigidity resulting in a rapidly dampening of osicillations. Also, the temperature sensitivity is reduced.

For optimizing the operation of the force measuring device, according to the invention, the height of the gap 18 may be of importance. This gap height should not be too small since via the two opposing surfaces 28 and 30 often considerable lateral forces will have to be transmitted.

By optimizing the gap 18 the influence of the temperature dependent spring characteristic of the silicone rubber may be minimized by a simultaneous reduction of measurement deflection which may be in the order of 0.01 mm. Also, a high stability against lateral forces is achieved.

By designing the upper member 11 in the form of a swimming body the effect of self alignment upon asymmetric loading is enhanced. With a force measuring device having dimensions as shown in FIG. 2, the height of the gap 18 may be in the order of 10 to 30 mm, preferably between 15 and 20 mm. The dimensions of the members 11 and 12 and the interspace between them filled with the elastomeric material are considered to be the dimensions of a preferred embodiment and these dimensions are made part of the description whilst deviations from these dimensions are in the option of a person skilled in the art.

With the embodiment according to FIGS. 2 and 3 as a pressure sensor an absolute pressure sensor is used, for instance the absolute pressure sensor KPY 14 manufactured by Siemens AG, Munich (FRG). This absolute pressure sensor 15 is embedded in the elastomeric material 13 in such a manner that there is no essential contact of the absolute pressure sensor 15 to either of the members 11 and 12. This results in a uniform pressure distribution and a good protection of the absolute pressure sensor, the compensation resistors and the cable against environmental influences in particular against penetration of gases and humidity. Thus, such a force measuring device may be used in an underwater enviroment.

As elastomeric materials 13 natural or synthetic materials may be used with a shore hardness in the range between 30 and 70 preferably 40 and 60. As an example for an elastomeric material 13 the silicone-rubber RTV-ME 625 of Wacker-Chemie AG, Munich (FRG) may be used.

A high uniformity and incompressibility of the elastomeric material are achieved in that air and gas bubbles are removed from the elastomeric material before or during the hardening thereof by the procedure according to the invention.

FIG. 5 is a sideview of an exemplary embodiment of the apparatus according to the invention showing to the left the apparatus in rest position and to the right in operating position.

It should be noted that for implementing the procedure according to the invention various apparatuses could be used or adapted to apply a sufficient acceleration for sufficient time to the synthetic material. Accordingly, the apparatus according to FIG. 5 is an exemplary preferred design just shown in principle.

FIG. 5 shows a motor 70 which is adapted to rotate its shaft 72 about a vertical axis 74. For the present embodiment the shaft 72 supports at a central position a horizontal beam 76. In principle a one-arm-arrangement would be sufficient or for mass production a carrousel type of apparatus having a plurality of starlike arranged beams may be used. At the ends of the beam 76 support members 62 are fixed at pivoted points 78 by means of wires, cords or rigid connection bars like an apothecaries' scale. The support members 62 may comprise moulds for one or several of the synthetic bodies to be fabricated or may consist of a plate for putting one or several moulds 64 onto it which are filled with the synthetic resin.

Upon energisation of the motor 70 the rotation of its shaft 72 causes the support members 62 to pivote from the rest position shown on the left hand side of FIG. 5 into a position exemplary shown on right hand side of FIG. 5. With increasing rotational speed the support members 62 are lifted more and more in view of the resultant of gravitation and centrifugal force.

Preferably, this centrifugal procedure is initiated soon after mixing of the two or several components of the synthetic material together and filling the mixture into the mould. Thus, the mixture is more or less in liquid form and the pressure created in the mixture presses the essentially lighter air bubbles out of the synthetic material and the mould.

Dependent on the material and the progress of the hardening accelerations of a multiple of g (acceleration of gravity) up to 100 may be applied to the material. The desired accelerations may be calculated on the basis of the rotational speed and the dimensions of the beam 76 and the cords 60. Alternatively the angular position of the support members 62 in respect of the horizontal direction at predetermined rotational speeds in test runs may be used for determining the acceleration.

As mentioned before the duration of the centrifugal process may be determined by means of simple test runs.

The effect of the centrifugal process may be improved by covering the mould 64 or the moulds on the support member 62 by placing a top member onto the material which essentially covers the material whilst air bubbles may be pressed out through a gap consisting between the rim of the mould and the peripheral edge of the top member 66.

With the apparatus according to this embodiment a force measuring device may be fabricated including a base member 64 provided with an upward projecting rim. The synthetic material to be hardened is exemplary silicon-rubber, RTV-ME 6 25 of Wacker Chemie AG Munchen (FRG). After pouring the mixture consisting of the base material and a hardening agent into the base part 64 acting as the bottom mould part, the top plate 66 is inserted which leaves a gap between the rim of the base part 64 and the peripheral surface of the top part 66. With an acceleration between 30 and 60 x g all air bubbles are pressed out of the elastomeric material in a vary short time between several seconds and one minute.

If a mould is used which is essentially closed it will be preferably to provide an air escape opening. Alternatively the uppermost layer of the material may be removed for instance cut away or ground away which layer will include all air bubbles in case the air is not completely accumulated above the synthetic material.

It should be noted that with such a centrifugal process also other particles having a density different from that of the synthetic material may be removed such that the resulting body will be extremely pure and uniform. Heavier particles would be forced to the bottom of the mould and can be removed there by removing the bottom layer of the body.

After the centrifugal process the material may complete hardening in rest at case the hardening is not yet completed during the centrifugal process. It should be noted, that the hardening may be enhanced by putting the moulds with the reacting mixture into an oven for applying an increased temperature. In addition, during rotation heating could be applied to the mould(s) if desired as explained in German Pat. No. 25 37 262. For producing force measuring devices according to FIGS. 2 and 3 the method explained before is applied as follows:

In view of the cuplike form the base member 12 may be used as the mould for the elastomeric material which considerably simplifies the production of the force measuring devices. First, the two (or more) reactant components of the elastomeric material are mixed by stirring in a well-known manner and a proper quantity of the mixture is poured into the base member 12 upon having arranged the pressure sensor 15 and the compensation resistors 16 in the latter. The base member is now placed onto the apparatus of FIG. 5 and rotated with a predetermined rotational speed for a predetermined time. The rotational speed and the time may be selected such that all air or gas bubbles are squeezed out of the reacting mixture. The two parameters will further depend on the type of elastomeric material used and at what a time after initiating hardening of the mixture has elapsed; a typical rational speed might be in the order of 50 to 500 rpm., preferably between 150 and 400 rpm.. The time period may vary between several seconds and several minutes, preferably in the range about one minute.

Although such a centrifugal process may be accomplished without placing the upper member 11 onto the base member 12 such a measure supports the pressure onto the elastic material resulting in a faster removal of air or gas bubbles which removal is further enhanced by the above mentioned convex shape of the lower surface of the upper member 11. Furthermore, with the upper member 11 in inserted position the force measuring device is already completed in its final form with the hardening mixture of the elastomeric material completely filling the gap between the upper member 11 and the base member 12.

An improved force measuring cell results from wetting all parts of the upper member and the base member coming into contact with the elastomeric material with a wetting agent contained in a solvent, for instance aceton or toluene, silanes or silicon resines. Such a primer, exemplary primer G 790 manufactured by Wacker-Chemie GmbH Munich (FRG) ensures that the elastomeric material fixly adheres to the metallic surfaces of the upper member and the base member. As result, there is no danger of penetration of humidity or dirt and lateral forces acting on the upper member are transferred to the base member through the elastomeric material in the gap without friction.

Figure 4:
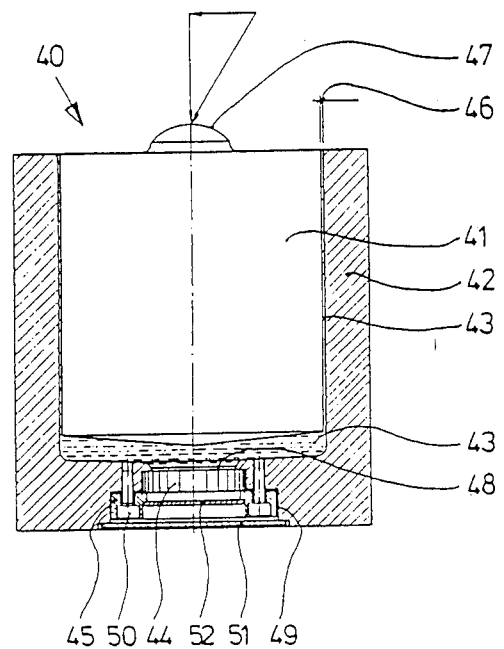
FIG. 4 is a side view partially in section of a second embodiment of a force measuring device produced in accordance with the method of the invention, and FIG. 5 a schematic diagram of an apparatus used for producing force measuring devices according to the invention.

FIG. 4 shows a further embodiment of a force measuring device preferably produced by using the method according to the invention. In FIG. 4 load cell 40 includes a potlike base member 42 having a relatively high cylindrical side wall. In the interior of the base member 42 a force introduction member specifically a force transmission piston 41 is provided at the upper face of which a spheric section may be provided for force introduction. The lower face of the piston 41 may be formed slightly convex or conical for enhancing removement of air bubbles when applying the method according to the invention. Between the lower face of the piston 41 and bottom of the base member 42 elastomeric material 43 is shown which preferably is a silicon rubber, exemplary RTV-ME 6 25 or RTV-ME 6 22 manufactured by the Wacker-Chemie GmbH Munich (FRG). Alternatively, any other elastomeric material mentioned before may be used. Silicon rubbers are preferred in view of the their exellent temperature constancy in a range between −100° C. bis +200° C. Furthermore, they are resistant against ozone and light influence as well as against oil.

In the bottom wall of the base member 42 there is at least one opening preferably a central opening 48 into which a pressure sensor 44 may be inserted and fixed by means of a ring 45. Specifically, after inserting the pressure sensor 44 from below the ring 45 is placed into a recess 49 at the bottom face surface of the base member 42 and exemplary fixed by means of screws 50 at the bottom wall of the base member 42. Finally, a cover plate 51 is bonded or otherwise fixed at the bottom face surface for an air and humidity tight connection.

One of the salient features of the embodiment of FIG. 4 is the relatively narrow and extremely high gap 46 between the peripheral surface of the piston 41 and the interior surface of the base member 42. Preferably, this gap is in the range of 0.05 to 2 mm, preferably 0.1 to 1 mm whilst its height is in the range of the diameter of the piston 41.

Compared with the embodiment according to the FIGS. 2 and 3 the load cell 40 according to FIG. 4 is adapted for use in connection with forces which have considerable lateral components which with the embodiment according to FIGS. 2 and 3 will tend to tilt the upper member in an oblique position which might lead to the blocking of its movement in vertical direction or at least to considerable friction. Considering the load cell 40 according to FIG. 4 an oblique force acting upon piston 41 is divided in a force component acting in direction of the piston axis as a vertical component and into a force component acting perpendicularly to the vertical component as a lateral force component. The latter is bypassed through the elastomeric material 43 in the gap 46 and the base member 42 into the base support (not shown). The vertical component causes in the elastomeric material 43 below the lower face of the piston 41 a pressure proportional to the vertical component, which pressure is captured by the pressure sensor 44.

The high, narrow gap 46 has the further advantage of an increased rigidity in load direction (smaller 0.01 mm) and offers the use of load cells 40 for extreme loads in the range of 1000 tons and more and an interior pressure up to 500 bars. The load cells 40 have a very compact size. For producing load cells 40 according to the method of the invention first all metalic surfaces of the base member 42 and the piston 41 which will come into contact with the elastomeric material 43 will be treated with an adhering agent as explained in connection with the embodiment of FIG. 2 and 3 in order to ensure a definite connection of the elastomeric material 43, in particular in the gap 46, to the surfaces of the piston the base member 42.

The opening 48 in the bottom wall of the base member 42 may be closed by the inserted pressure sensor 44 or by a plate of similar size. As described before a mixture of two (or more) reactant components of the elastomeric material are mixed together and a poper amount of the mixture is poured into the interior of the base member 42. For removing all air bubbles the device is placed onto the apparatus of FIG. 45 and rotated for a time period which might even be below one minute with a rotational speed of exemplary 300 rpms, assuming that the device is arranged at a distance from the rotational axis of about 500 mms. Upon stopping the apparatus piston 41 is inserted and there is a second centrifugal step similar to the first step removing the rest of air bubbles and having the elastomeric material 43 rising into the narrow gap 46 up to the upper edge of the base member 42. The gap 46 will be completely filled with the elastomeric material 43 which will fixedly adhere to the surfaces of the piston 41 and the base member 42 due to the primer treatment mentioned before.

Alternatively, the two step procedure may be replaced by a one step procedure by inserting the piston 41 immediately after pouring the mixture into the interior of the base member 42. Thus, only one centrifugal step is necessary. After this one centrifugal step or after the second step the device is maintained at rest for completing hardening (provided that the hardening has not yet been finished during the centrifugal step (s)).

Now, if the pressure sensor 44 was not placed into the opening 48 at the beginning of the process, the plate closing this opening is removed and a pressure sensor 44 is inserted which has been calibrated and compensated separately from the load cell 40.

It should be noted, that this feature of a separately and replaceably attaching of the pressure sensor 44 to the load cell 40 is of considerable advantage since the pressure sensor 44 may be calibrated and compensated by corresponding compensating resistors separately and individually without using the load cell 40. Electrical parts necessary, in particular the compensating resistors may be applied to a circuit board 52 arranged below the pressure sensor 44 or to the bottom face surface of the pressure sensor 44 by a conventional thick layer technique. Alternatively, an intelligent pressure sensor might be used having integrated calibration and compensation means. Obviously, the pressure sensor 44 is connected by a cable (not shown) to appropriate evaluation means well-known in the art.

It should be appreciated that the embodiment according to FIG. 4 is the best mode for carrying out the invention in particular when vertical force components are to be measured of forces which act upon the force introducing member at an oblique angle to the vertical direction.

Whilst the method according to the invention is the best mode for producing the force measuring devices of the type described before other procedures for removing air bubbles from elastomeric material may be used as applying vacuum to the elastomeric material as it is known in the art.

We claim:

1. A force measuring device comprising:
   (a) a base member;
   (b) a force introduction member spaced from said base member to form a space therebetween, one said member having a cylindrical recess and the other said member being fitted into said recess so as to form a narrow annular gap between an inner peripheral surface of said recessed member and an outer peripheral surface of said other member;
   (c) a body of essentially bubblefree elastomeric material provided in a bottom region of said cylindrical recess and in engagement with an inner face surface of said force introduction member and extending into said gap; and
   (d) at least one pressure sensor in said space in contact with said body of elastomeric material.

2. The force measuring device of claim 1, wherein a vertical dimension of said gap is in the range of one to four times the diameter of said cylindrical recess.

3. The force measuring device of claim 1 wherein said width of said gap is in the range of 1/100 to 1/100 of the diameter of said cylindrical recess.

4. The force measuring device of claim 1 or 3 wherein said height of said gap is in the range of 1/50 to five times the diameter of said cylindrical recess.

5. The force measuring device of claim 1 or 3 wherein said
   elastomeric material is one of the materials selected from the group comprising:
   silicon rubber, styrene rubber, butadiene rubber, polysulfide rubber, a polyacrylate, a polyurethane, or a mixture of any of said materials.

6. The force measuring device of claim 1 or 3 wherein said elastomeric material strongly adheres to surfaces of said base member and said force introduction member in contact therewith.

7. The force measuring device of claim 6 wherein said elastomeric material is vulcanized to said surfaces of said base member and said force introduction member in contact therewith.

8. The force measuring device of claim 1 wherein said pressure sensor is a piezoelectric sensor means.

9. The force measuring device of claim 1 wherein a bottom wall of said base member is provided with an opening for removably receiving said pressure sensor.

10. The force measuring device of claim 9 further comprising fixing means for mounting said pressure sensor in said opening and closure means for tightly sealing said opening after insertion of said pressure sensor.

11. The force measuring device of claim 1 wherein said width of said gap is in the order of 0.1 to 2 mm.

12. The force measuring device of claim 1 wherein a lower face surface of said force introduction member is convexly shaped in the downward direction.

13. The force measuring device of claim 1 or 12 wherein a bottom surface of said cylindrical recess is concavely shaped in upward direction.

14. A force measuring device comprising:
   (a) a base member having an extended upper surface;
   (b) a force introduction member having an extended lower surface arranged opposite and in spaced relationship to said upper surface of said base member;
   (c) a body of essentially bubblefree elastomeric material arranged between said surfaces and strongly adhering thereto; and
   (d) a plurality of pressure sensors distributed within an area defined by said upper and lower surfaces and arranged in contact with said elastomeric material.

* * * * *